(12) United States Patent
Bills et al.

(10) Patent No.: US 8,905,706 B2
(45) Date of Patent: Dec. 9, 2014

(54) VORTEX PROPELLER

(76) Inventors: Chris Bills, Provo, UT (US); Donald Moriarty, Provo, UT (US)

( * ) Notice: Subject to any disclaimer, the term of this patent is extended or adjusted under 35 U.S.C. 154(b) by 693 days.

(21) Appl. No.: 13/163,300

(22) Filed: Jun. 17, 2011

(65) Prior Publication Data

US 2011/0311363 A1 Dec. 22, 2011

Related U.S. Application Data

(60) Provisional application No. 61/355,927, filed on Jun. 17, 2010.

(51) Int. Cl.
*F03D 1/06* (2006.01)

(52) U.S. Cl.
CPC ............ *F03D 1/0633* (2013.01); *F05B 2240/30* (2013.01); *Y02E 10/721* (2013.01); *F05B 2240/132* (2013.01); *F05B 2250/25* (2013.01); *F05B 2240/133* (2013.01)
USPC ........................ 415/72; 416/177; 416/223 R

(58) Field of Classification Search
CPC ............ F05D 2240/30; F05D 2250/25; F05D 2250/15; F05D 2250/712; F04D 3/02; F04D 29/2216; F04D 29/2238; F04D 29/2244
USPC ............ 415/71, 72, 76; 416/175–177, 223 R, 416/227 A/R, 231 A/R, 232, 234, 243
See application file for complete search history.

(56) References Cited

U.S. PATENT DOCUMENTS

| | | | |
|---|---|---|---|
| 323,734 A * | 8/1885 | Randall | 416/176 |
| 1,371,610 A * | 3/1921 | Dungan | 416/176 |
| 1,519,447 A | 12/1924 | Fortier-Beaulieu | |
| 1,603,599 A | 10/1926 | Heibl | |
| 2,359,171 A | 9/1944 | Tarbox | |
| 3,301,485 A | 1/1967 | Tropeano et al. | |
| 4,070,131 A | 1/1978 | Yen | |
| 4,218,175 A * | 8/1980 | Carpenter | 415/219.1 |
| 4,360,315 A | 11/1982 | Olson | |
| 4,382,746 A | 5/1983 | Retz | |
| D274,208 S | 6/1984 | Hildenbrand | |
| 4,652,788 A | 3/1987 | Lauche et al. | |
| 5,020,967 A | 6/1991 | Gual et al. | |
| D368,886 S * | 4/1996 | Kuryliw | D12/214 |
| 5,503,615 A | 4/1996 | Goldstein | |
| 5,997,242 A * | 12/1999 | Hecker et al. | 415/72 |

(Continued)

FOREIGN PATENT DOCUMENTS

| | | |
|---|---|---|
| DE | 806006 | 6/1949 |
| JP | 2008/144646 | 6/2008 |
| JP | 2008144646 A * | 6/2008 |
| WO | WO 2009/062261 | 5/2009 |

OTHER PUBLICATIONS

JP 2008144646 A—Machine Translation.*

(Continued)

*Primary Examiner* — Edward Look
*Assistant Examiner* — Juan G Flores
(74) *Attorney, Agent, or Firm* — Thorpe North & Western LLP

(57) ABSTRACT

The invention discloses at least one blade extending away from a beginning point and longitudinally along a central axis and approximating the shape of a spiral about said central axis. The blade comprises a beginning point disposed a first lateral distance away from the central axis and a terminating point disposed a second lateral distance away from the central axis, the second distance being greater than the first distance.

18 Claims, 15 Drawing Sheets

(56) References Cited

U.S. PATENT DOCUMENTS

| | | | |
|---|---|---|---|
| 6,138,781 | A | 10/2000 | Hakala |
| 6,249,059 | B1 | 6/2001 | Hosoda |
| 6,481,645 | B1 | 11/2002 | Taylor-McCune et al. |
| 7,086,823 | B2 | 8/2006 | Michaud |
| 7,347,660 | B2 | 3/2008 | Taylor et al. |
| 2004/0112055 | A1 | 6/2004 | Michaud |
| 2006/0263201 | A1* | 11/2006 | Harman .................. 415/72 |

OTHER PUBLICATIONS

Hand; Chapter 4, Analytic Vortex/Rotor Interaction; Mitigation of Wind Turbine/Vortex Interaction Using Disturbance Accommodating Control; Dec. 2003; pp. 22-35.

Vortex; Wikipedia, The Free Encyclopedia; 6 pages; as accessed May 26, 2010.

Betz' Law; Wikipedia, The Free Encyclopedia; 6 pages; as accessed on May 28, 2010.

Vorticity; Wikipedia, The Free Encyclopedia; 6 pages; as accessed on May 26, 2010.

Maiers et al; Trinity Vehicle Wind Energy White Paper; Mar. 18, 2009; 14 pages; Trinity Energy Applications Inc.

Burton et al.; Wind Turbine Blade Aerodynamics, section 2; Wind Energy Handbook; Nov. 15, 2001; 10 pages.

PCT Application PCT/US2011/040950; filed Jun. 17, 2011; Chris Bills; International Search Report mailed Jan. 9, 2012.

* cited by examiner

VORTEX PROPELLER

CLAIM OF PRIORITY

The present application claims priority to U.S. Provisional Patent Application Ser. No. 61/355,927 filed on Jun. 17, 2010 and entitled "Vortex Propeller" which is incorporated herein by reference in its entirety.

FIELD OF THE INVENTION

The present invention relates generally to propeller devices, and more particularly to propellers for turning a turbine or being turned by a powered device such as an engine to create propulsion.

BACKGROUND

Propeller blades are designed to generate the maximum power at the minimum cost. The design of those blades is driven primarily by aerodynamic requirements. However, economics requires that the blade shape constitute a compromise to optimize the cost of construction versus the value of power production. The blade design process starts with a "best guess" compromise between aerodynamic and structural efficiency. The choice of materials and manufacturing process will also have an influence on how thin (hence aerodynamically ideal) the blade can be built (e.g., carbon fiber is stiffer and stronger than infused glass fiber). The chosen aerodynamic shape gives rise to loads, which are fed into the structural design. Problems identified at this stage can then be used to modify the shape, if necessary, and recalculate the aerodynamic performance.

With respect to power derived from wind turbines, the available power varies as the cube of the wind speed—accordingly, twice the wind speed equals eight times the power. Typically, wind speeds below about 5 m/s (10 mph) do not create sufficient power to be useful. Conversely, strong gusts provide extremely high levels of power. However, it is not economically viable to build turbines to optimize power peaks as their capacity would be wasted during intervals between gusts. In addition to day-to-day variations in wind power, the wind is subject to instantaneous variability due to turbulence caused by land features, thermal influences, and weather. Moreover, wind velocity tends to be greater above the ground due to surface friction. All these effects lead to varying loads on the blades of a turbine as they rotate.

The turbine itself has an effect on the wind. Downwind of the turbine, air moves more slowly than upwind. The wind starts to slow down even before it reaches the blades, reducing the wind speed through the "disc" (the imaginary circle formed by the blade tips, also called the swept area) and hence reducing the available power. Some of the wind traveling in the direction of the disc diverts around the slower-moving air and misses the blades entirely. Thus, there is an optimum amount of power to extract from a given disc diameter (i.e., if one attempts to take too much and the wind will slow down too much, reducing the available power). In fact, in a traditional wind mill configuration, it is believed than an ideal design would reduce the wind speed by about two thirds downwind of the turbine, though even then the wind just before the turbine will have lost about a third of its speed. This allows a theoretical maximum of 59% of the wind's power to be captured (referred to as Betz's limit). It is believed that in practice only 40-50% of the winds available power is captured by current designs.

Number of Blades

The greater number of blades used in connection with a turbine, the less power each can extract. The total blade area as a fraction of the total swept disc area is called the solidity. Aerodynamically, there is an optimum solidity for a given tip speed; the higher the number of blades, the narrower each blade must be. In traditional wind turbines, the optimum solidity is low (only a few percent) which means that even with only three blades, each one must be very narrow. To slip through the air easily the blades must be thin relative to their width, so the limited solidity also limits the thickness of the blades. However, the thinner blades become, the more expensive they are to construct in order to meet the structural demands placed on the blades.

Just like the wing of an airplane, wind turbine blades work by generating lift due to their shape. The more curved side generates low air pressures while high pressure air pushes on the other side of the airfoil. The net result is a lift force perpendicular to the direction of flow of the air. The lift force increases as the blade is turned to present itself at a greater angle to the wind. This is called the angle of attack. At very large angles of attack the blade "stalls" and the lift decreases again. As such, there is an optimum angle of attack to generate the maximum lift. There is, unfortunately, also a retarding force on the blade: the drag. This is the force parallel to the wind flow which also increases with angle of attack. In an appropriately shaped airfoil, the lift force is much bigger than the drag. However, at very high angles of attack, especially when the blade stalls, the drag increases dramatically. As such, the blade reaches its maximum lift/drag ratio at an angle slightly less than the maximum lift angle.

As drag is in the downwind direction, it would seem drag would not slow down a turbine rotor as the drag would be parallel to the turbine axis. That is, it would only create "thrust", the force that acts parallel to the turbine axis and hence has no tendency to speed up or slow down the rotor. When the rotor is stationary (e.g. just before start-up), this is indeed the case. However, the blade's own movement through the air means that, the wind is blowing from a different angle. This is called apparent wind. The apparent wind is stronger than the true wind but its angle is less favorable: it rotates the angles of the lift and drag to reduce the effect of lift force pulling the blade around and increase the effect of drag slowing it down. It also means that the lift force contributes to the thrust on the rotor. As a result, to maintain an optimal angle of attack, the blade must be turned further from the true wind angle.

Twist

Rotating turbine blades travel faster at the blade tip than at the root, hence there is a greater apparent wind angle. Because of the increased velocity at varying points about the length of the blade, the optimal angle of attack of the blade also varies about the length of the blade. Accordingly, the blade must be turned further at the tips than at the root. In other words, the blade is ideally built with a twist along its length. In traditional windmill designs, the twist is around 10-20° from root to tip.

In addition to blade twist, optimal lift/drag characteristics are obtained by an airfoil that is fairly thin—its thickness ideally might be only 10-15% of its "chord" length (the length across the blade, in the direction of the wind flow). Other structure requirements, however, demand that the blade be designed to support lift, drag and gravitational forces. These structural requirements generally mean the airfoil needs to be thicker than the aerodynamic optimum, especially at locations towards the root (where the blade attaches to the hub) where the bending forces are greatest. Fortunately, that is also where the apparent wind is moving more slowly and the blade has the least leverage over the hub. As such, some aerodynamic inefficiency at that point has less impact on overall performance than inefficiencies near the blade tip.

To increase thickness near the root without creating a very short, fat, airfoil section, some designs use a "flatback" section. This is either a standard section thickened up to a square trailing (back) edge, or a longer airfoil shape that has been truncated. This reduces the drag compared to a rounder section.

Blade Shape

The planform shape is traditionally used to give the blade an approximately constant slowing effect on the wind over the whole rotor disc (i.e. the tip slows the wind to the same degree as the center or root of the blade). This ensures that none of the air leaves the turbine too slowly (causing turbulence), yet none is allowed to pass through too fast (which would represent wasted energy).

Because the tip of the blade is moving faster than the root, it passes through more volume of air, hence must generate a greater lift force to slow that air down. Fortunately, lift increases with the square of speed so its greater speed generates sufficient lift. In practice, the blade can be narrower close to the tip than near the root and still generate enough lift. The optimum tapering of the blade planform as it goes outboard can be calculated. Roughly speaking, the chord should be inverse to the radius (e.g., if the chord was 2 m at 10 m radius, it should be 10 m at 1 m radius). This relationship breaks down close to the root and tip, where the optimum shape changes to account for tip losses. In practice, a fairly linear taper is sufficiently close to the optimum for most designs. It is also thought to be structurally superior and easier to build than the optimum shape.

Rotational Speed

The speed at which the turbine rotates is a fundamental choice in the design, and is defined in terms of the speed of the blade tips relative to the "free" wind speed (i.e. before the wind is slowed down by the turbine). This is called the tip speed ratio. High tip speed ratio means the aerodynamic force on the blades (due to lift and drag) is almost parallel to the rotor axis. As such, it relies on a good lift/drag ratio. Low tip speed ratio would seem like a better choice but unfortunately results in lower aerodynamic efficiency, due to two effects. Because the lift force on the blades generates torque, it has an equal but opposite effect on the wind, tending to push it around tangentially in an opposite direction. The result is that the air downwind of the turbine has "swirl" (i.e. it spins in the opposite direction to the blades). That swirl represents lost power which reduces the available power that can be extracted from the wind. Lower rotational speed requires higher torque for the same power output, so lower tip speed results in higher wake swirl losses.

The other reduction in efficiency at low tip speed ratio comes from tip losses, where high-pressure air from the upwind side of the blade escapes around the blade tip to the low-pressure side, thereby wasting energy. As power equals force times speed, at slower rotational speed, the blades need to generate more lift force to achieve the same power. To generate more lift for a given length the blade has to be wider. This means, geometrically speaking, that a greater proportion of the blade's length can be considered to be close to the tip. Thus, more of the air contributes to tip losses and the efficiency decreases. Various techniques can be used to limit tip losses such as winglets (commonly seen on airliners) but few are employed in practice owing to their additional cost.

The higher lift force on a wider blade also translates to higher loads on the other components such as the hub and bearings. As such, low tip speed ratio will increase the cost of these items. On the other hand, the wide blade is better able to carry the lift force (as discussed previously), so the blade itself may be cheaper.

All this means that turbine designers typically compromise on tip speed ratios in the region of 7-10, so at design wind speed (usually 12-15 meters per second) the blade tip can be moving at around 120 m/s (approximately 270 miles per hour). Practical limits on the absolute tip speed include bird impacts and rain erosion, as well as noise, all of which increase with tip speed.

Power and Pitch Control

For an economical design, the maximum performance of the generator and gearbox of a wind turbine, for example, are limited to an appropriate level for the operating environment of a particular turbine. Ideally, the turbine should be able to extract as much power as possible from the wind up to the rated power of the generator, then limit the power extraction at that level as the wind increases further.

If the blades' angle is kept constant, the turbine is unable to respond to changes in wind speed. This enables an optimum angle of attack to generate the maximum power at varying wind speeds, however, the only way to "depower" the machine in high wind speeds is by relying on the blades to stall (known as passive stall control). This in the non-flat power curve above the rated wind. Accordingly, to limit the maximum power, a passive stall-controlled turbine will usually be operating somewhat below its maximum potential.

If instead the blades are attached via a bearing that allows the angle of attack to be varied (active pitch control), the blades can be angled to maintain optimum efficiency right up to the design wind speed (at which the generator is producing its rated output). Above the design wind speed, blades can be "feathered" (i.e. rotated in pitch to decrease their angle of attack and hence their lift, and thus controlling the power). In survival conditions, the turbine can be stopped altogether and the blades feathered to produce no turning force at all.

An alternative to decreasing the angle of attack above the design wind speed comprises an increase to the angle to the point where the blade stalls (active stall control). This decreases lift and increases drag, which has the desired slowing effect on blade rotation and also less sensitive to gusts of wind than feathering. That is, by decreasing the apparent wind angle, gusts increase the angle of attack which tend to make the blade stall more. Therefore controlling blade speed by stall rather than feathering can be beneficial in gusty conditions.

SUMMARY OF THE INVENTION

It has been recognized that it would be advantageous to develop a propeller that optimizes fluid flow in light of the deficiencies contained in prior art designs. Accordingly, the present invention provides a propeller device, comprising at least one blade extending away from a beginning point and longitudinally along a central axis, said blade approximating the shape of a spiral about said central axis and having a beginning point near said central axis. The blade comprises a beginning point disposed a first lateral distance away from the central axis and a terminating point disposed a second lateral distance away from the central axis, the second distance being greater than the first distance. In one aspect of the invention, the propeller device comprises a plurality of blades configured to approximate the shape of a vortex.

In accordance with an additional embodiment of the invention, a propeller device is disclosed comprising at least one blade disposed within a vortex shaped funnel, said blade extending longitudinally along a central axis of the vortex-shaped funnel from the mouth of the vortex-shaped funnel to the end of the funnel. The blade is configured to approximate the shape of a spiral disposed about the central axis of the funnel. In one aspect of the invention, the propeller device comprises a plurality of blades configured to approximate the shape of a vortex.

The present invention also resides in a propeller device comprising a plurality of blades disposed laterally about a central axis, where each of said blades advances longitudinally along the central axis and around the central axis from a beginning point near the central axis to an ending point away from the central axis to approximate the shape of a spiral. The plurality of blades are configured such that there is an equal amount of space between each of the plurality of blades from the beginning point of each of the plurality of the blades to the ending point of each of the plurality of blades.

The present invention also resides in a propeller device comprising a plurality of blades disposed laterally about a central axis, where each of said blades advances longitudinally along the central axis and around the central axis from a beginning point near the central axis to an ending point away from the central axis to approximate the shape of a spiral. The plurality of blades are configured such that there is a first amount of space between each of the plurality of blades near the beginning point of each of the plurality of the blades and a second amount of space near the ending point of each of the plurality of blades. The first distance is different from the second distance.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 7B shows a bottom view of the single vortex blade of 7a;

DETAILED DESCRIPTION OF EXAMPLE EMBODIMENTS

Figure 1A:
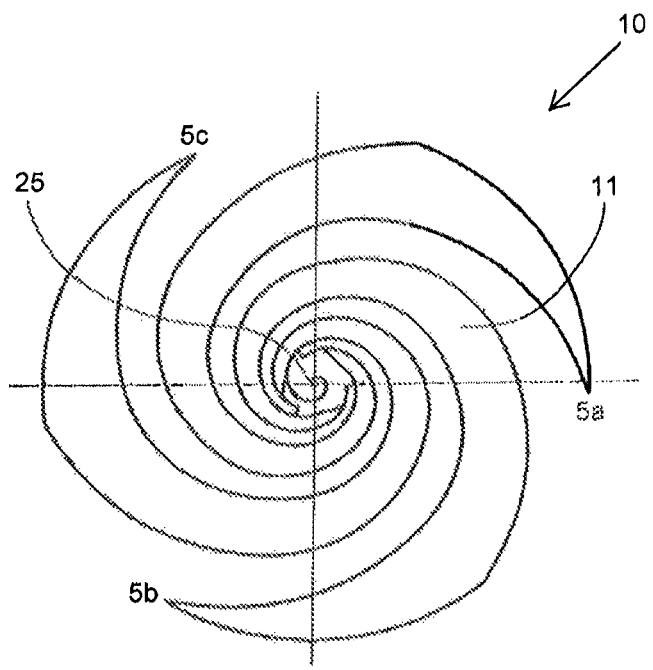
FIGS. 1A-1C show a three blade vortex propeller in accordance with one embodiment of the present invention.

The following detailed description of exemplary embodiments of the invention makes reference to the accompanying drawings, which form a part hereof and in which are shown, by way of illustration, exemplary embodiments in which the invention may be practiced. It is believed that an alternative propeller design which utilizes the natural vortex behavior of fluids would greatly increase turbine efficiencies and/or the propulsive efficiency of a propeller. However, before the present invention is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is to be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Methods and systems are set forth herein for optimizing propeller efficiency. Particular embodiments set forth methods and systems for turning a turbine using a vortex-shaped propeller. In one aspect, the vortex-shaped propeller comprises solid portions enabling at least some irrotational flow about portions of the propeller and open portions enabling fluid flow (e.g., wind) through the propeller to induce propeller rotation.

It should be understood that the embodiments discussed herein are contemplated for use with any type of device where rotation of a device (e.g., induced from the flow of a fluid or vice versa) is desired, and any type of vehicle that can be made to move about. For purposes of illustrating the various aspects of the methods and systems claimed herein, the discussion below will be primarily directed to describing exemplary embodiments directed to wind turbines. It should be noted, however, that the elements and principles discussed herein are applicable to other turbines and/or devices for generating power or inducing propulsion (i.e., acting as a propeller on a boat, for example).

It is also noted that discussion of methods and systems herein can be interchangeable with respect to specific embodiments. In other words, specific discussion of a method herein is equally applicable to embodiments as they relate to the system, and vice versa.

Generally speaking, embodiments of the present invention are intended to make use of the natural energy efficiencies present in a vortex. A vortex is a spinning, often turbulent, flow of fluid. Any spiral motion with closed streamlines is vortex flow. The motion of the fluid swirling rapidly around a center is called a vortex. It is believed that the speed and rate of rotation of the fluid in a free (irrotational) vortex are greatest at the center, and decrease progressively with distance from the center, whereas the speed of a forced (rotational) vortex is zero at the center and increases proportional to the distance from the center. Both types of vortices exhibit a pressure minimum at the center, though the pressure minimum in a free vortex is thought to be much lower.

A vortex can be any circular or rotary flow. However, not all vortices possess vorticity. Vorticity is a mathematical concept used in fluid dynamics that can be related to the amount of "circulation" or "rotation" in a fluid. In fluid dynamics, vorticity is the circulation per unit area at a point in the flow field. It is a vector quantity, whose direction is (roughly speaking) along the axis of the swirl. The vorticity of a free vortex is zero everywhere except at the center, whereas the vorticity of a forced vortex is non-zero. Vorticity is an approximately conserved quantity, meaning that it is not readily created or destroyed in a flow. Therefore, flows that start with minimal vorticity, such as water in a basin, create vortices with minimal vorticity, such as the characteristic swirling and approximately free vortex structure when it drains. By contrast, fluids that initially have vorticity, such as water in a rotating bowl, form vortices with vorticity, exhibited by the much less pronounced low pressure region at the center of this flow. Also in fluid dynamics, the movement of a fluid can be said to be vortical if the fluid moves around in a circle, or in a helix, or if it tends to spin around some axis. Such motion can also be called solenoidal.

Mathematically, vorticity $\vec{\omega}$ is defined as the curl of the fluid velocity $\vec{u}$:

$$\vec{\omega} = \vec{\nabla} \times \vec{u}$$

As noted above, a distinction is often made between two limiting vortex cases. One is called the free (irrotational) vortex, and the other is the forced (rotational) vortex. When fluid is drawn down a plug-hole, one can observe the phenomenon of a free vortex or line vortex. The tangential velocity v varies inversely as the distance r from the center of rotation, so the angular momentum, rv, is constant; the vorticity is zero everywhere (except for a singularity at the center-line) and the circulation about a contour containing r=0 has the same value everywhere. The free surface (if present) dips sharply (as $r^{-2}$) as the center line is approached. The tangential velocity of free vortex is given by:

$$v_\theta = \frac{\Gamma}{2\pi r}$$

where $\Gamma$ is the circulation and r is the radial distance from the center of the vortex. In non-technical terms, the fluid near the center of the vortex circulates faster than the fluid far from the center. The speed along the circular path of flow is held constant or decreases as one moves out from the center. At the same time the inner streamlines have a shorter distance to travel to complete a ring.

In a forced vortex, the fluid essentially rotates as a solid body (there is no shear). The motion can be realized by placing a dish of fluid on a turntable rotating at $\omega$ radians/sec; the fluid has vorticity of $2\omega$ everywhere, and the free surface (if present) is a parabola. The tangential velocity of a forced vortex is given by:

$$v_\theta = \omega r$$

where $\omega$ is the angular velocity and r is the radial distance from the center of the vortex.

In accordance with one embodiment of the invention, and with specific reference to powering a turbine, a propeller is disclosed which approximates the shape of a vortex. Broadly speaking, the propeller comprises a plurality of blades terminating in the shape of a perimeter of a circle. Each of the blades extends outwardly and away from the circle in a helical (or spiral) orientation. At some distance away from the circle, the radius of the spiral increases such that the proximate blades approximate the shape of a funnel. At the distal end (or beginning point) of the propeller, each of the terminating portions of the blades are equidistant from one another about the perimeter of an imaginary circle and equidistant from a central axis. The center of the imaginary circle is collinear with the central axis about which each of the blades is disposed.

With reference to an embodiment related to use of the vortex-shaped propeller to power a wind turbine, the vortex-shaped propeller is configured to capture the flow of wind and induce irrotational flow about the inside of the vortex-shaped propeller. The pitch and twist of the blades of the propeller are configured to optimize the angle of attack and the number of blades associated with the propeller are configured to optimize the lift of each blade as well as he total swept disc area. The angle of attack and lift associated with the propeller configuration varies significantly from traditional propeller design, in part, due to the difference in the air flow regime created by the vortex-shaped propeller itself. In another embodiment, the vortex-shaped propeller may be attached to a device (e.g., a motor) capable of causing the propeller to rotate despite the absence of any wind or fluid flow. In this manner, the vortex-shaped propeller may be utilized to induce fluid flow to propel a vehicle or for some other suitable purpose.

Generally speaking, in one embodiment of the invention, a propeller device is disclosed having at least one blade extending away from a beginning point of the blade and extending longitudinally along a central axis. As noted above, the blade is configured to approximating the shape of a spiral turning about said central axis. A beginning point of the blade is near the central axis disposed a first lateral distance away from the central axis and a terminating point is disposed a second lateral distance away from the central axis. In one aspect of the invention, the second distance is greater than the first distance. Put another way, the blade has a first radius near a beginning point of the central axis and a second radius near a terminating point. The second radius is greater than the first radius.

As noted above, the propeller device can comprise a plurality of blades disposed together to approximate the shape of a vortex. The beginning points of each of the plurality of blades are disposed equidistant about the perimeter of an imaginary circle, wherein the center of the imaginary circle is collinear with the central axis. The beginning points may be laterally spaced very close to the center of the imaginary circle (almost zero) leaving essentially no hole at the end of the vortex, or they may be laterally spaced apart from the center to create a large hole at the end of the vortex. In one aspect of the invention, the plurality of blades are laterally adjustable away from the central axis and/or towards the central axis. In this manner, the blades may be configured to yield to significant variations in fluid flow without suffering stress at various mechanical attachment points. In other words, rather than assuming a fixed orientation, the blades are attached to one another so as to provide the vortex with the ability to contract or expand.

Figure 1B:
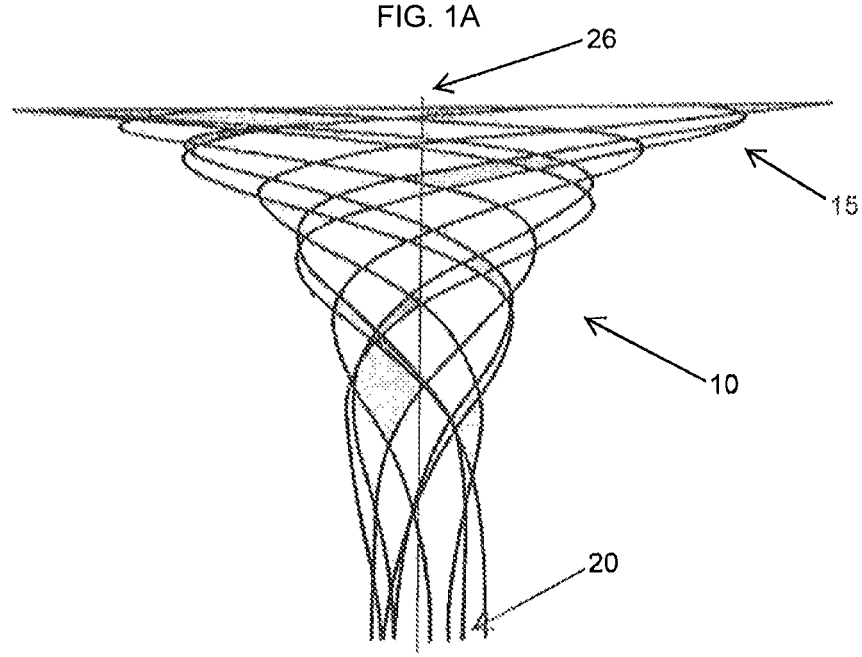
Figure 1C:
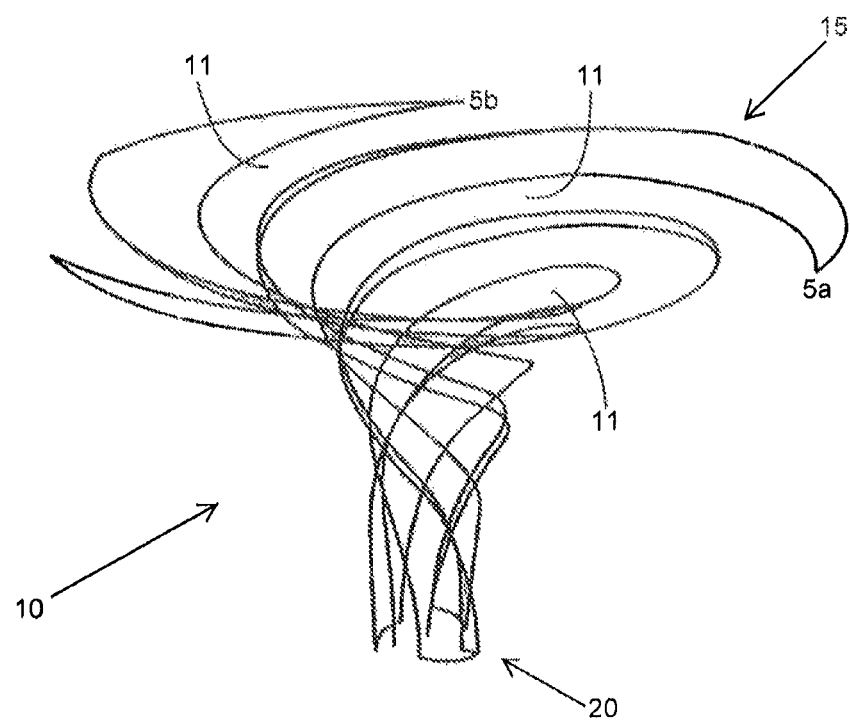

With specific reference now to the figures, FIGS. 1A-1C, in accordance with one embodiment of the present invention, a vortex shaped propeller 10 is disclosed. It is believed that the flow of wind resulting from the innovative propeller design shall focus energy flow more toward the center or rotor, rather than the blade tips. The blade configuration creates a natural transition of flow from resistant to directional as it pulls to the center. As the air flows toward the center of the blade, it is believed will speed up (due to Bernoulli's principle) thereby increasing the speed of air applied to the inner portion of the propeller. FIGS. 1A-1C show a three-blade configuration in accordance with one embodiment of the present invention. Each of the blades 5a, 5b, and 5c, of the propeller 10 comprise a helical or spiral configuration about a central axis 15. In one aspect of the invention, the helical orientation of the blades can be configured as logarithmic spirals or Archimedean spirals. A logarithmic spiral can be distinguished from the Archimedean spiral by the fact that the distances between the turnings of a logarithmic spiral increase in geometric progression, while in an Archimedean spiral these distances are constant. Logarithmic spirals are self-similar in that they are self-congruent under all similarity transformations (scaling them gives the same result as rotating them). Scaling by a factor $e^{2\pi b}$ gives the same as the original, without rotation. They are also congruent to their own involutes, evolutes, and the pedal curves based on their centers. In one aspect of the invention, the blades are configured to form a "golden spiral." A golden spiral is a logarithmic spiral that grows outward by a factor of approximately 1.618 for every 90 degrees of rotation (pitch about 17.03239 degrees). The use of logarithmic spirals and Archimedean spirals may be used to optimize different wind profiles and blade orientation designs as suits a particular purpose.

While the logarithmic spiral and Archimedes spirals are specifically referenced above, it should be appreciated that other spiral configurations can be utilized. For example, a conic spiral, Fermat's spiral, Fibonacci spiral, hyperbolic spiral, or other geometric spiral could be utilized in connection with the invention described herein. Additionally, in one embodiment of the invention, the blades of the propeller have a convex or concave geometry with respect to a central axis. It is believed that in some applications, a convex or concave geometry will assist in optimizing rotation.

Referring again to FIGS. 1A-1C, the blades 5a, 5b, and 5c extend longitudinally along a central axis 26 and spiral about the central axis 26 from a proximal end 20 of the propeller to a distal end 15 of the propeller. The blades 5 begin at points within the same plane approximating the shape of a circle. The center of the circle is collinear with a central axis 26 of the propeller. It is believed that the air passing through the propeller 10 will create lift forces which act upon the blades 5a, 5b, 5c more efficiently than traditional propeller designs. Additionally, it is believed that the total swept disc area is optimized. It is important to note that because the wind passing through the propeller is believed to be formed into an irrotational vortex, the lift forces acting on the blades vary in direction as the direction of the forces acting on the blades also varies. Wind flow which does not pass through the spaces 11 between the blades 5 passes through the center 25 of the propeller 10 thereby minimizing the overall reduction of wind flow past the propeller 10.

In accordance with one aspect of the invention, protrusions ("air fences") are disposed about the face of the blades 5 to increase the resistance over the face of the blade 5 or the speed at which fluid passes over the face of the blade 5. In this manner, the aerodynamic forces which act on the blade 5 are increased due to the velocity differential on opposing sides of the blade 5. The air fences may comprise a plurality of rounded or rectangular nubs of varying height or any other suitable design that forces the fluid to travel about the face of the blade 5 at an increased velocity. Additionally, dimples may be disposed on an opposing side of the blade 5 to cause the boundary layer on the upstream side of the blade to transition from laminar to turbulent. The turbulent boundary layer is able to remain attached to the surface of the blade 5 much longer than a laminar boundary and so creates a narrower, low pressure, wake and hence less pressure drag.

Figure 2A:
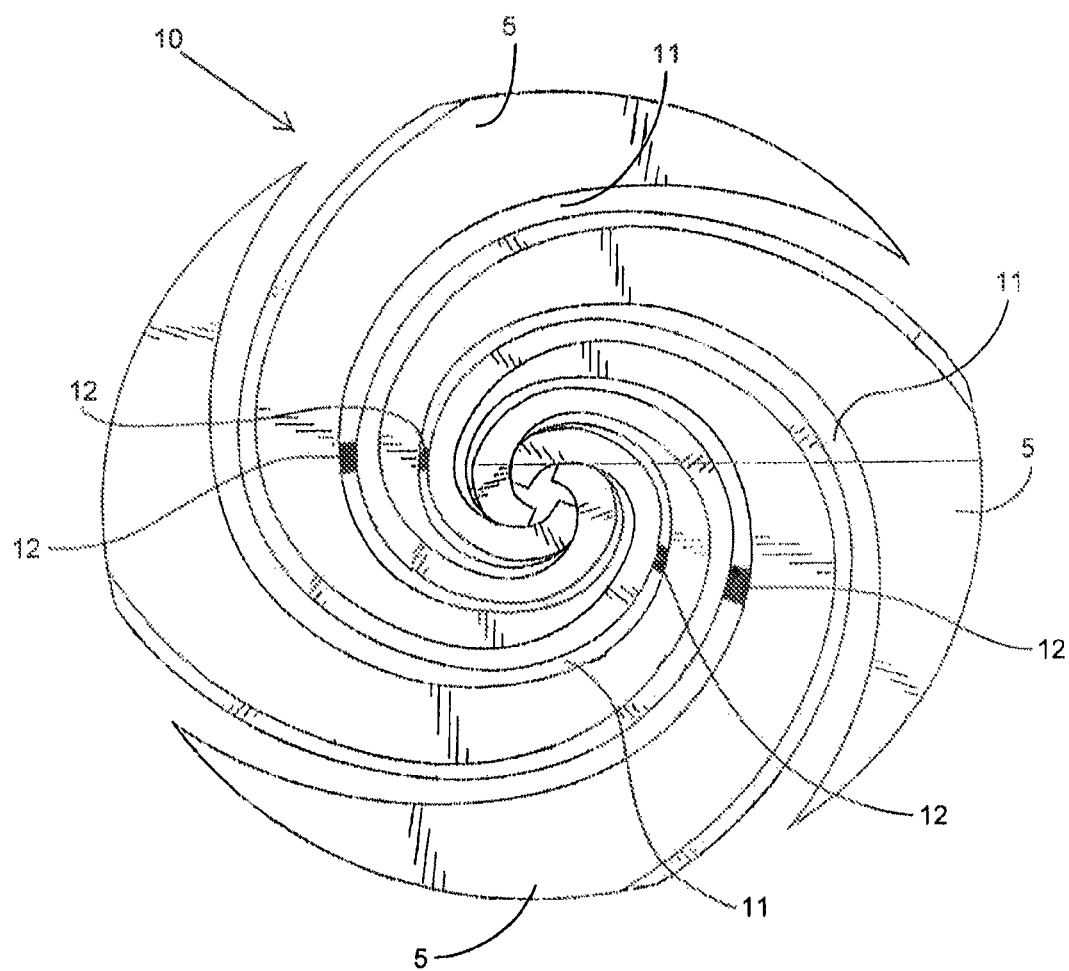
FIGS. 2A-2C show a four blade vortex propeller in accordance with one embodiment of the present invention.
Figure 2B:
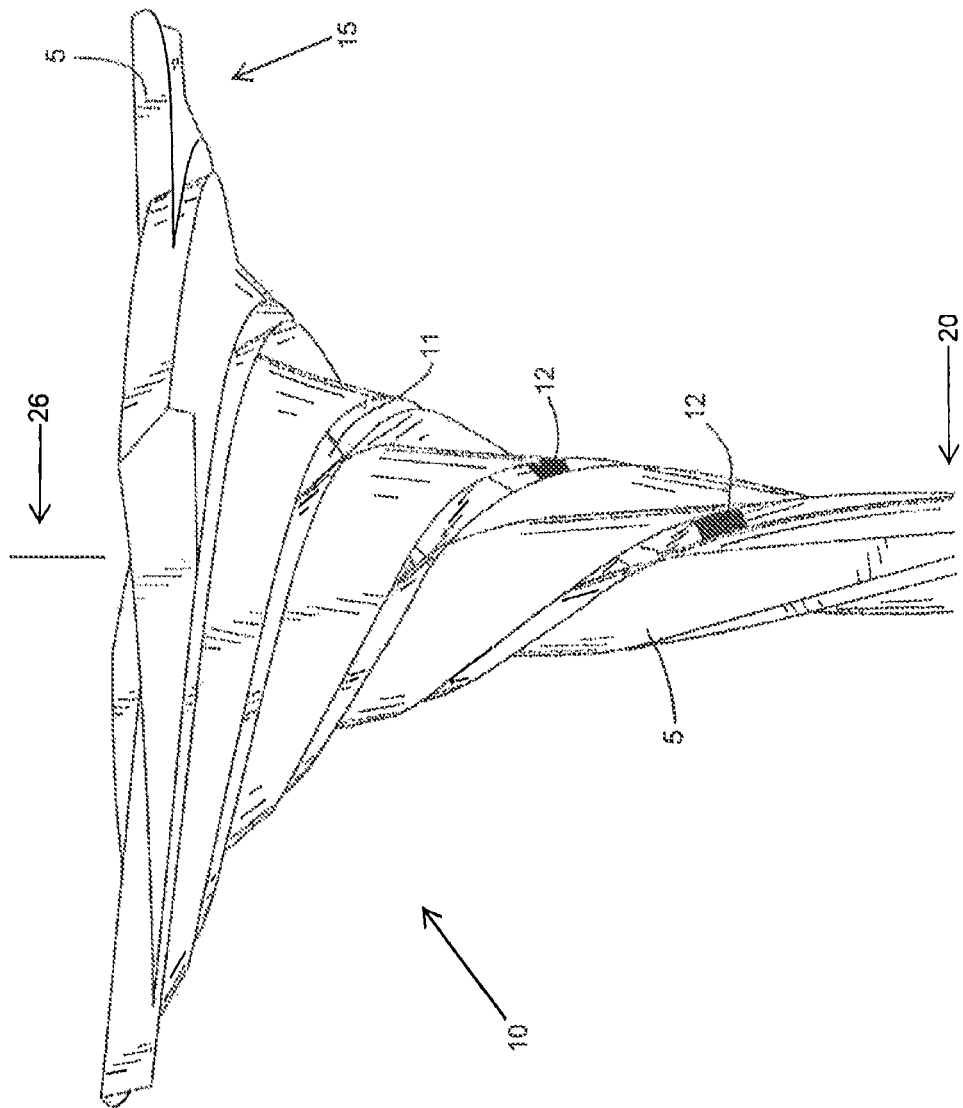
Figure 2C:
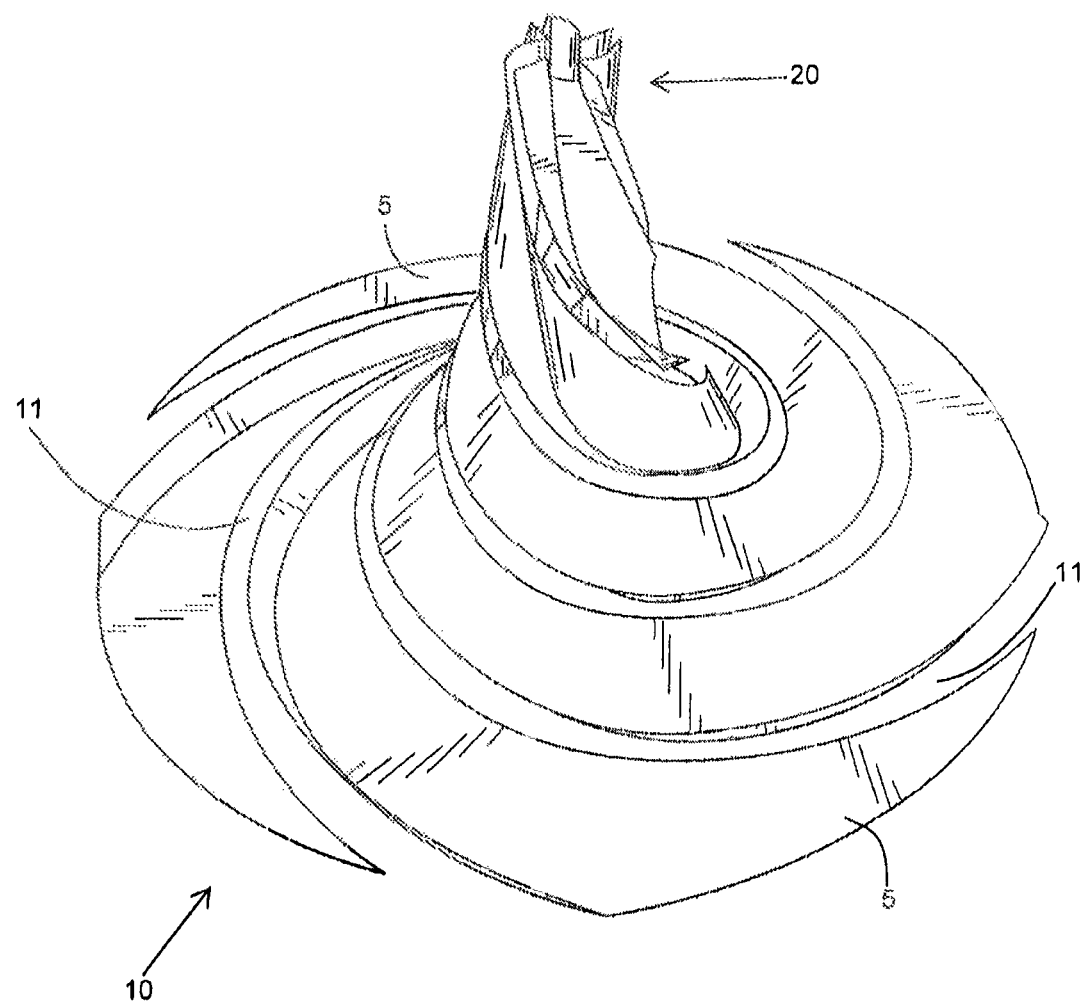
Figure 3:
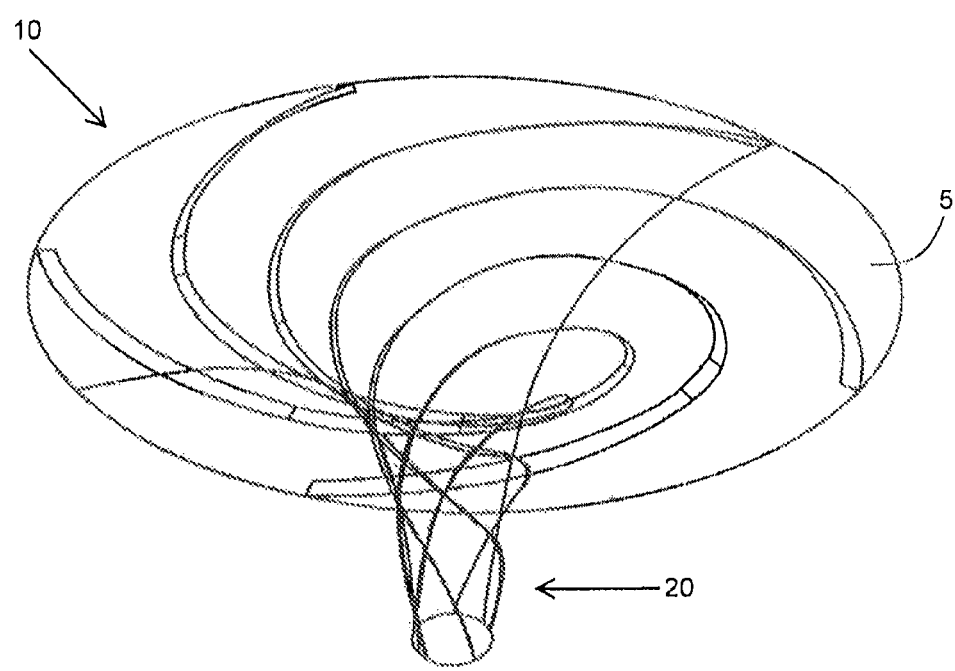
FIG. 3 shows a five blade vortex propeller in accordance with one embodiment of the present invention.
Figure 4A:
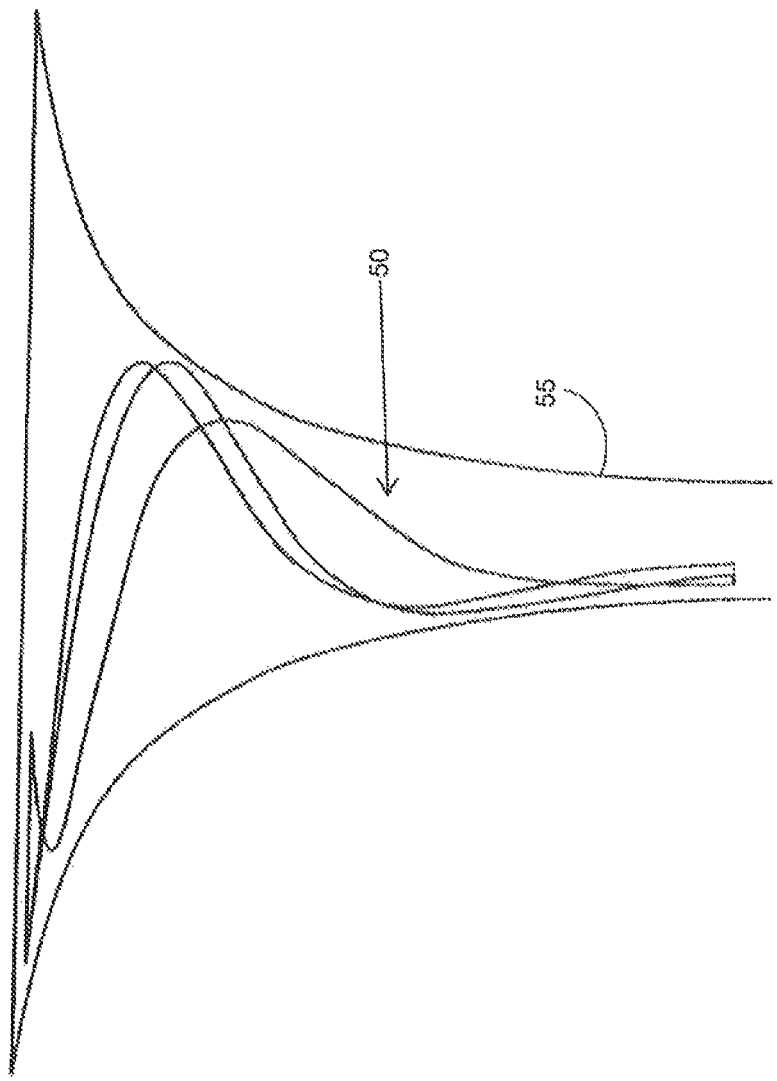
FIGS. 4A-4B shows a single blade vortex propeller in accordance with one embodiment of the present invention.
Figure 4B:
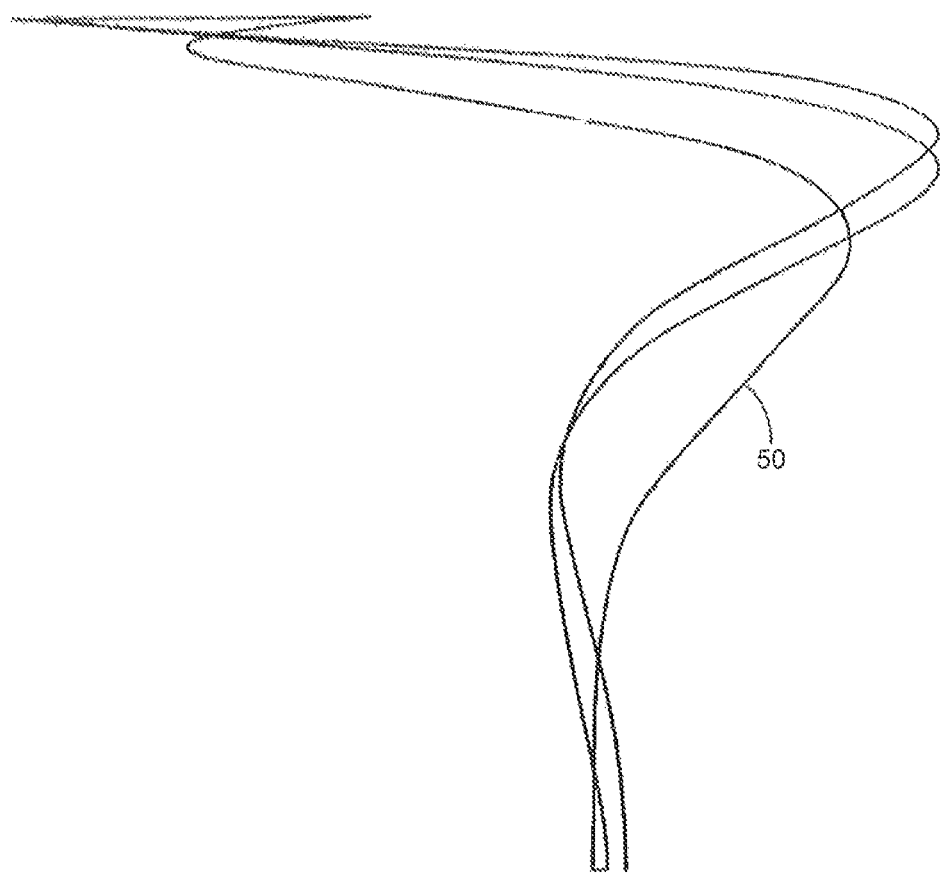

While reference is made to a propeller with three blades 5 in FIGS. 1A-1C, it is important to note that other configurations with more or less blades 5 are contemplated herein. For example, FIGS. 2A-2C show an embodiment with four blades 5, FIG. 3 shows an embodiment with five blades 5, and FIGS. 4A-4B show an embodiment with one blade 50. As noted above, the number, pitch, twist, and orientation of the blades 5 will vary depending on the desired application. The blades 5 may be interconnected at different locations along the propeller 10 with a rigid member and/or an elastic member 12 to allow for expansion of the space 11 between the blades during high wind gusts. Additionally, the space 11 between the blades may be varied along the central axis 26 of the propeller to optimize fluid flow. For example, in one embodiment, the rim or proximal end of the propeller may have no space between the blades (i.e., a solid, funnel-type configuration) with spaces 11 between the blades appearing towards the distal end of the propeller 10. In another example, the blades 5 may merge into a solid towards the distal or terminating end of the propeller 5. In one aspect of the invention, the propeller 10 has no space at all between the blades 5.

Figure 5:
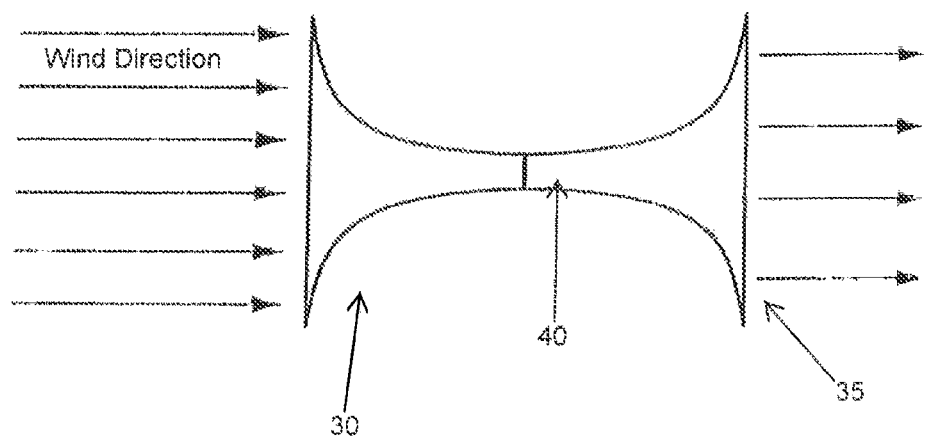
FIG. 5 shows a side view of a vortex shaped propeller with a vortex-shaped outlet in accordance with one embodiment of the present invention.

In one embodiment, a propeller 30 comprises two vortex-shaped propellers with the distal ends connected to one another as shown in FIG. 5. In this manner, air flowing through the propeller exits out the rear 35 gradually to minimize drag from air exiting the smaller diameter portion 40 of the propeller. In another aspect of the invention, the end portion of a first vortex-shaped propeller comprises a stationary vortex-shaped diffuser to minimize drag exiting from the smaller diameter portion of the propeller. In one aspect, the exit diameter of the vortex-shaped diffuser is smaller than the diameter of the mouth of vortex-shaped propeller.

Referring back to FIG. 4A, in accordance with one embodiment of the present invention, the propeller 50 may be housed in a venturi-type funnel 55. It is believed that the drag created around the blade tips of the propeller 50 may be minimized by discouraging vortex generation about the tips by use of the funnel 55. Additionally, a larger opening about the tunnel 55 may divert additional wind flow through the propeller 50 thereby increasing the propeller rotation.

Figure 6A:
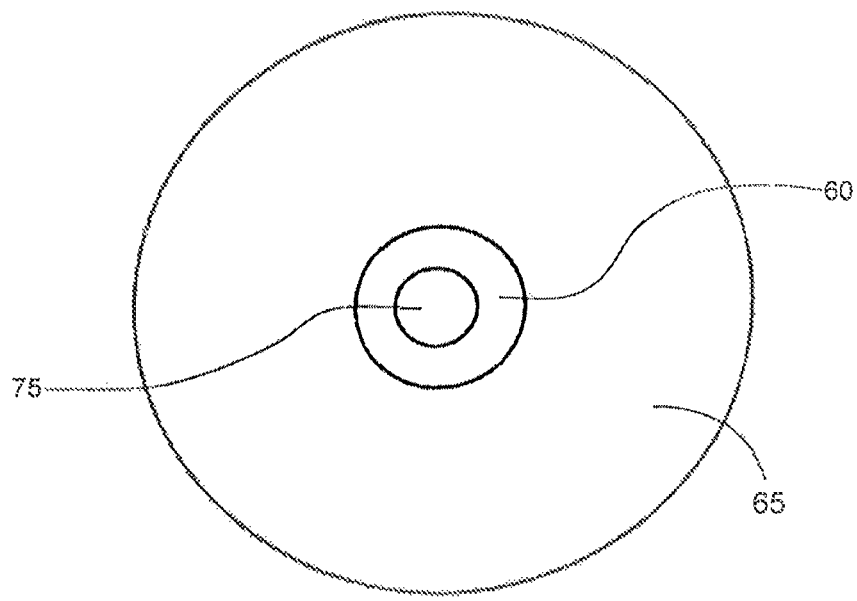
FIGS. 6A-6B shows an exemplary annular hollow electric generator in accordance with one embodiment of the present invention.
Figure 6B:
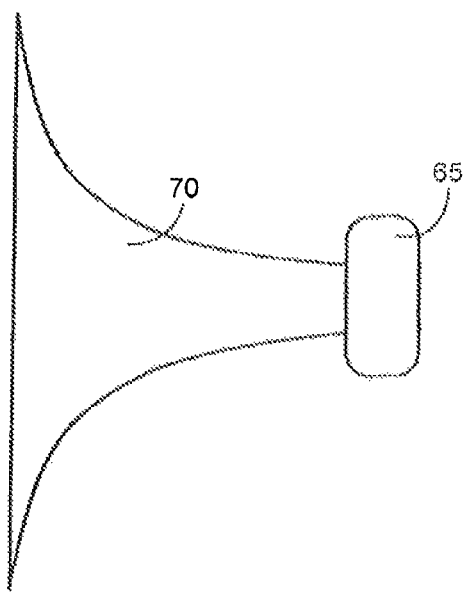

In one aspect of the invention, the blades are mounted to a rotating rotor which moves about a stator thus creating electricity through electromechanical means as is known in the art. A rotor is a non-stationary part of a rotary electric motor, electric generator, or alternator, which rotates because the wires and magnetic field of the motor are arranged so that a torque is developed about the rotor's axis. In some aspects, the rotor can act to serve as the motor's armature, across which the input voltage is supplied. The stationary part of an electric motor is the stator. Depending on the configuration of a spinning electromotive device, the stator may act as the field magnet interacting with the armature to create motion. It may also act as the armature, receiving its influence from moving field coils on the rotor. Referring generally to FIGS. 6A and 6B, in one aspect of the present invention, a rotor 60 (which is mounted to the terminal ends of the propeller blades or integrally formed as part of the distal end of the propeller blades) is disposed within a stator 65. The rotor 60 rotates circularly inside of the stator 65. In one aspect, the rotor 60 comprises an annular ring made of an appropriate electromagnetic material. The stator 65 also comprises an annular ring made of an appropriate electromagnetic material, the rotor 60 being placed within the stator and configured to be driven by the vortex-shaped propeller 70. Advantageously, air flowing through the vortex shaped propeller 70 which does not pass through the blades but is drawn to the center 75 of the propeller 70, may pass through the center 75 of the propeller and the center of the rotor 75 with limited resistance thus minimizing the total amount of wind velocity passing through the swept area.

The wind turbine blade consists of an aerodynamic shell and an internal girder such as a beam or a spar. The girder can be a single beam, but two girders can be used. Along with the shell, the girders form a box profile. The aerodynamic shell comprises a laminate of fiber reinforced plastics, fiberglass and/or other materials. The section(s) of the aerodynamic shell where the internal girders are placed is/are usually reinforced in some way and is/are consequently often thick. The other part(s) or section(s) of the aerodynamic shell is typically only a thin skin or a laminate such as a sandwich construction with thin skins and a core material. A blade is typically provided by gluing or bonding or otherwise connecting two shell parts to each other.

In operation, the blade is subject to flapwise, edgewise, and torsional loads. The flapwise direction is a direction substantially perpendicular to a transverse axis through a cross-section of the widest side of the blade. Alternatively, the flapwise direction may be construed as the direction (or the opposite direction) in which the aerodynamic lift acts on the profile. The edgewise direction is perpendicular to the flapwise direction. The edgewise loads (associated with the blades own weight), even though typically smaller than the flapwise loads, can potentially cause damage to the blade, especially fatigue damage and ultimately lead to failure of the blade. Embodiments of the present invention minimize flapwise loads due, in part, to the different direction of the aerodynamic forces acting on the blades and the unique blade configuration.

In one aspect of the invention, the concept of the vortex shaped funnel and vortex shaped propeller are combined. That is, a vortex shaped funnel is provided wherein certain portions of the funnel comprise propeller blades which may rotate independent of the funnel or may rotate parts of the funnel as suits a particular application.

Figure 7A:
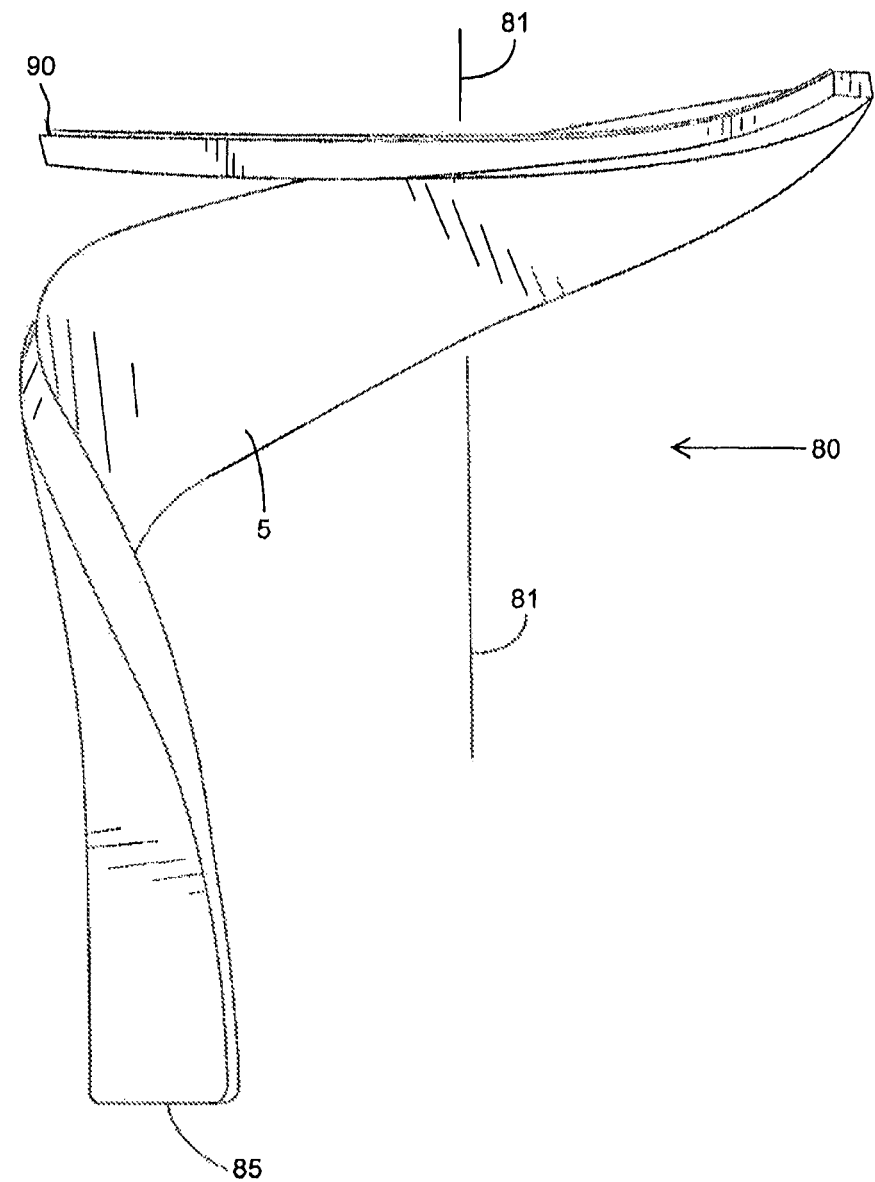
FIG. 7A shows a side view of one embodiment of a single vortex blade in accordance with one embodiment of the present invention.
Figure 7B:
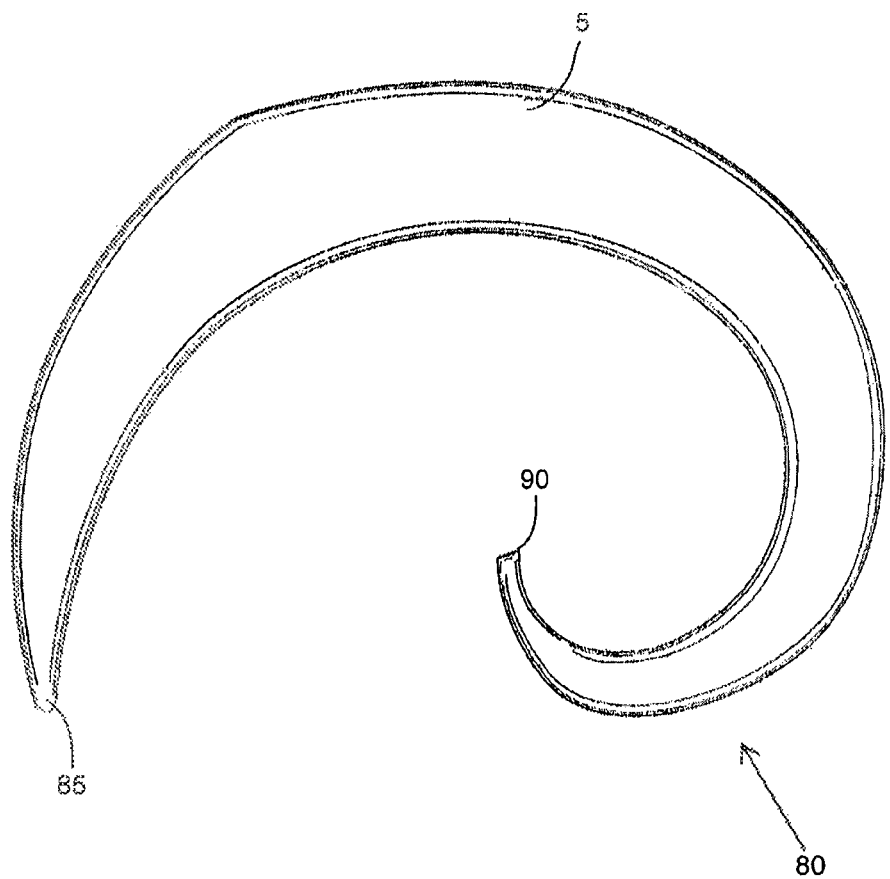

Referring again to the figures, in FIGS. 7A-7B, a propeller 80 is shown with a single blade 5 design in accordance with one embodiment of the invention. In one aspect, the blade 5 does not exhibit significant spiraling about the central axis 81 near the beginning point 85 of the propeller 80. Rather, the propeller 80 extends longitudinally along the central axis 81 exhibiting a twist in the blade 5 for a predetermined distance before beginning to spiral about the central axis 81.

Figure 8A:
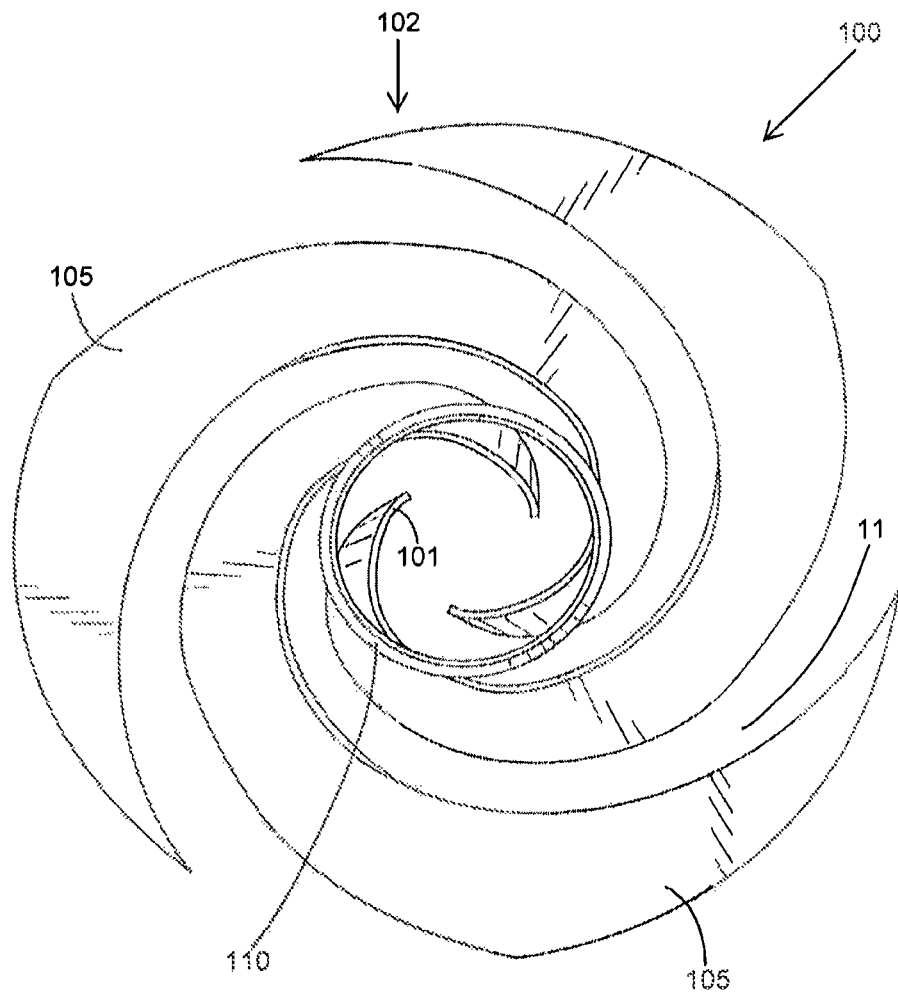
FIG. 8A shows a bottom view of one embodiment of a three blade vortex propeller in accordance with one embodiment of the present invention.
Figure 8B:
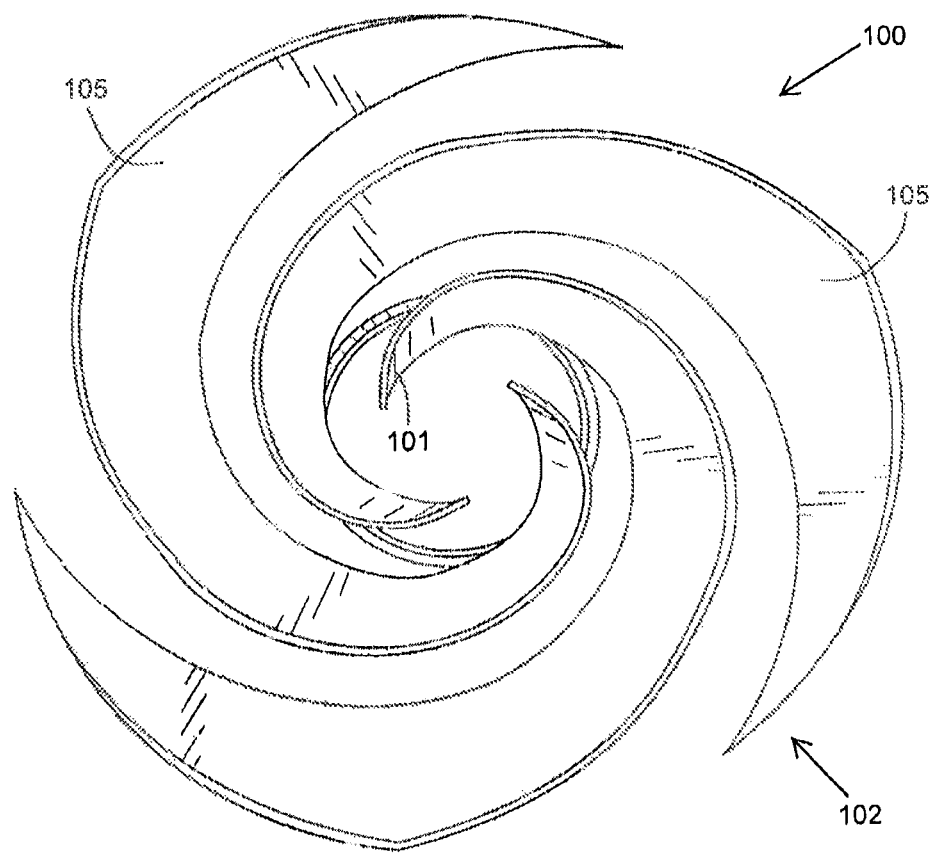
FIG. 8B shows a top view of the three blade vortex propeller of FIG. 8A.
Figure 8C:
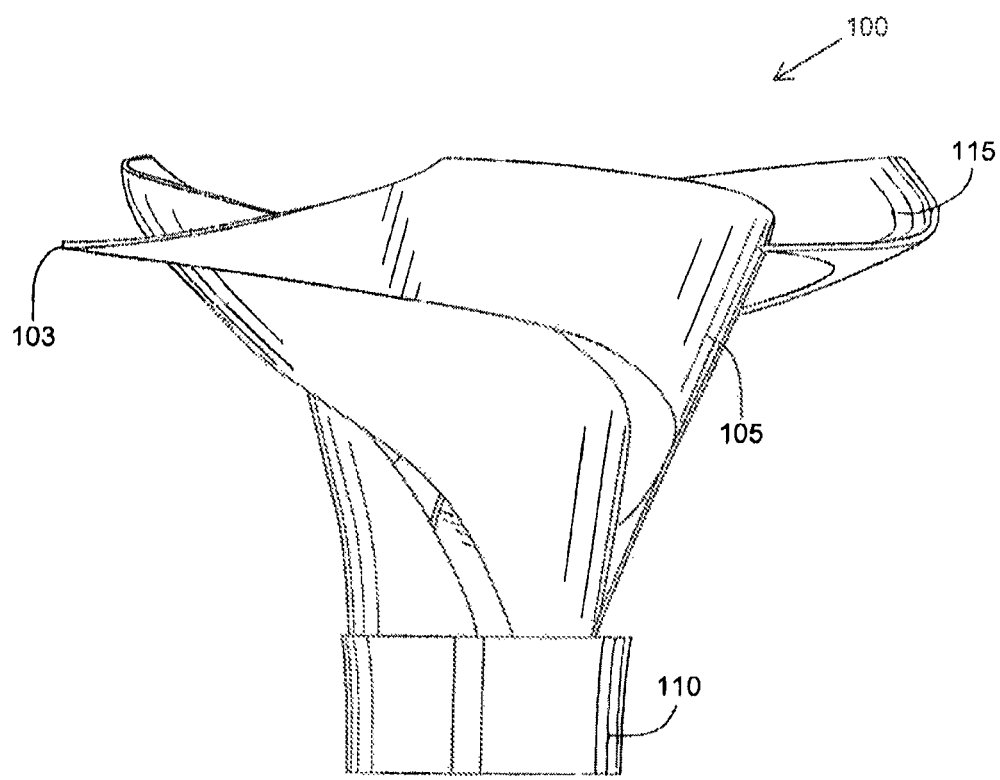
FIG. 8C shows a side view of the three blade vortex propeller of FIG. 8A.

Referring now to FIGS. 8A-8C, a three bladed propeller 100 is disclosed in accordance with one embodiment of the present invention. In one aspect of the invention, a beginning end 101 each of the blades 105 is housed within a collar 110. The center of the collar is collinear with a central axis of the propeller 100. In one aspect of the invention, the width of the blades varies along the longitudinal length of the blade 105. In particular, the blades are wider near a beginning end 101 of the blades 105 and narrow towards a terminating end 102 of the blades 105. In one aspect, the blades terminate in a point 103. Additionally, as described above, the blades 105 are concave 115 at some points along the length of the blade. It is important to note that the concavity or convex geometry of the blades may vary along the length of the blade to the extent that a portion of the blade may exhibit concave or convex geometry and other portions of the blade may be substantially flat or assume some other desirable geometry as suits a particular purpose.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

The invention claimed is:

1. A propeller device for capturing wind energy, comprising:
   at least one blade extending away from a beginning point near a central axis and extending longitudinally along the central axis, said blade approximating the shape of a spiral about said central axis and forming an open center about the central axis, wherein the beginning point is located in the downwind direction of wind flow with respect to a terminating point;
   wherein said blade comprises a first radius near the beginning point and a second radius near a terminating point, the first radius being smaller than the second radius; and
   wherein the central axis is disposed horizontal to a ground surface.

2. The propeller device of claim 1, comprising a plurality of blades disposed together to approximate the shape of a vortex.

3. The propeller device of claim 2, wherein the first distance is substantially near zero.

4. The propeller device of claim 2, wherein the first distance is substantially greater than zero.

5. The propeller device of claim 2, wherein the beginning points of each of the plurality of blades are disposed equidistant about the perimeter of an imaginary circle, wherein the center of the imaginary circle is collinear with the central axis.

6. The propeller device of claim 2, wherein the lateral distance of each of the plurality of blades from the central axis is fixed.

7. The propeller device of claim 2, further comprising a device disposed about the exterior of the beginning end of the blades configured to generate electricity from rotation of the blades.

8. The propeller device of claim 7, wherein the device comprises a rotor and a stator.

9. The propeller device of claim 2, further comprising a diffuser configured to approximate the shape of a vortex, wherein a front of the diffuser is disposed at the beginning end of the plurality of blades.

10. The propeller device of claim 1, wherein the spiral comprises a conic spiral, Fermat's spiral, logarithmic spiral, Archimedes spiral, Fibonacci spiral, hyperbolic spiral, golden spiral, or geometric spiral.

11. The propeller device of claim 1, wherein the spiral comprises a logarithmic spiral having a growth rate of 1.618 for every ninety degrees of rotation.

12. The propeller device of claim 1, wherein the blade has a concave geometry with respect to the central axis.

13. The propeller device of claim 1, wherein the blade has a convex geometry with respect to the central axis.

14. The propeller device of claim 1, wherein the blade is operatively coupled to a device configured to power the propeller causing the propeller to rotate.

15. A propeller device for capturing wind energy, comprising:
   at least one blade disposed within a vortex-shaped funnel, said blade extending longitudinally along a central axis of the vortex-shaped funnel from a mouth of the vortex-shaped funnel to the end of the funnel;
   wherein the blade is configured to approximate the shape of a spiral disposed about the central axis of the funnel, wherein the diameter of the spiral is larger at the mouth of the funnel than at the end of the funnel, and wherein the mouth of the funnel is located in the upwind direction of wind flow with respect to the end of the funnel.

16. The propeller device of claim 15, further comprising a plurality of blades disposed about the central axis to approximate the shape of a vortex.

17. A vortex shaped propeller system for capturing wind energy, comprising:
   a plurality of blades disposed laterally about a central axis, wherein an internal edge of each of said blades advances longitudinally along the central axis and around the central axis from a beginning point near the central axis to an ending point away from the central axis to approximate the shape of a spiral, wherein the beginning point is located in the downwind direction of wind flow with respect to the ending point;
   wherein the plurality of blades are configured such that there is an equal amount of space between each of the plurality of blades from the beginning point of each of the plurality of the blades to the ending point of each of the plurality of blades, and wherein said blades comprise a first radius near the beginning point and a second radius near the ending point, the first radius being smaller than the second radius.

18. A vortex shaped propeller system for capturing wind energy, comprising:
   a plurality of blades disposed laterally about a central axis, wherein each of said blades advances longitudinally along the central axis and around the central axis from a beginning point near the central axis to an ending point away from the central axis to approximate the shape of a spiral, wherein the beginning point is located in the downwind direction of wind flow with respect to the ending point; and
   wherein the plurality of blades are configured such that there is a first amount of space between each of the plurality of blades near the beginning point of each of the plurality of the blades and a second amount of space near the ending point of each of the plurality of blades, wherein the first distance is different from the second distance, and wherein said blades comprise a first radius near the beginning point and a second radius near the ending point, the first radius being smaller than the second radius.

* * * * *